United States Patent
Zhang

(10) Patent No.: US 9,158,121 B2
(45) Date of Patent: Oct. 13, 2015

(54) DISPLAY DEVICE AND A DRIVING METHOD FOR THE SAME

(71) Applicant: BOE Technology Group Co., Ltd., Beijing (CN)

(72) Inventor: Yuting Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 226 days.

(21) Appl. No.: 13/995,496

(22) PCT Filed: Nov. 23, 2012

(86) PCT No.: PCT/CN2012/085142
§ 371 (c)(1),
(2) Date: Jun. 18, 2013

(87) PCT Pub. No.: WO2013/127205
PCT Pub. Date: Sep. 6, 2013

(65) Prior Publication Data
US 2014/0063366 A1    Mar. 6, 2014

(30) Foreign Application Priority Data

Feb. 28, 2012  (CN) .......................... 2012 1 0048822

(51) Int. Cl.
*G09G 5/02* (2006.01)
*G02B 27/22* (2006.01)
(Continued)

(52) U.S. Cl.
CPC ............ *G02B 27/2214* (2013.01); *G09G 3/003* (2013.01); *G09G 3/20* (2013.01);
(Continued)

(58) Field of Classification Search
None
See application file for complete search history.

(56) References Cited

U.S. PATENT DOCUMENTS 8,519,908 B2    8/2013    Lee et al.
2008/0231952 A1   9/2008    Kim
(Continued)

FOREIGN PATENT DOCUMENTS

CN     1822088 A    8/2006
CN   101271199 A    9/2008
(Continued)

OTHER PUBLICATIONS

International Preliminary Report on Patentability for International Application No. PCT/CN2012/085142 dated Sep. 2, 2014, 11pgs.
(Continued)

*Primary Examiner* — Kathy Wang-Hurst
*Assistant Examiner* — David Tung

(57) ABSTRACT

Disclosed are a display device and a driving method thereof in 2D/3D display field. The display device comprises: a display panel comprising a pixel electrode array, wherein each of the pixel electrode comprises at least one main pixel electrode portion (P1, P2) and at least one secondary pixel electrode portion (P1', P2'), a gate line (GE1, GE2) is disposed between two adjacent rows of pixel electrodes, a gate line (GO1, GO2) is disposed between portions of each pixel electrode, a data line (DO) is disposed between two adjacent columns of pixel electrodes, and all portions of the pixel electrodes in the same column are connected to a same data line (DO); and a gate driving device (3-2) for inputting a gate shift pulse and a control signal to the display panel, so that for the display panel, in a 2D mode, all portions of the pixel electrodes are inputted with data signals, and in a 3D mode, a portion of each pixel electrode is inputted a data signal while another portion is not inputted with the data signal but used to form a black stripe. In the display device and the driving method for the same, black stripes are formed in the display panel so that the display device has larger viewing angle without affecting the visibility and luminance of the display device.

9 Claims, 3 Drawing Sheets

(51) Int. Cl.
  *G02F 1/1343* (2006.01)
  *G09G 3/00* (2006.01)
  *G09G 3/20* (2006.01)

(52) U.S. Cl.
  CPC .............. *G02F2001/134345* (2013.01); *G09G 2300/0443* (2013.01); *G09G 2310/063* (2013.01); *G09G 2320/0209* (2013.01)

(56) References Cited

U.S. PATENT DOCUMENTS

| | | |
|---|---|---|
| 2011/0122239 A1 | 5/2011 | Baik et al. |
| 2011/0128269 A1 | 6/2011 | Lee et al. |
| 2013/0063411 A1 | 3/2013 | Hou et al. |
| 2014/0063366 A1 | 3/2014 | Zhang |

FOREIGN PATENT DOCUMENTS

| | | |
|---|---|---|
| CN | 101750813 A | 6/2010 |
| CN | 102081911 A | 6/2011 |
| CN | 102801911 A | 6/2011 |
| CN | 102193260 A | 9/2011 |
| CN | 102323697 A | 1/2012 |
| CN | 102651203 A | 8/2012 |
| JP | 2009-015100 A | 1/2009 |

OTHER PUBLICATIONS

State Intellectual Property Office of the People's Rebulic of China, First Office Action dated Oct. 29, 2013 in priority Chinese application No. 201210048822.8 (Chinese language).

English translation of State Intellectual Property Office of the People's Rebulic of China, First Office Action dated Oct. 29, 2013 in priority Chinese application No. 201210048822.8 (above).

PCT International Search Report dated Mar. 7, 2013 in priority International Application No. PCT/CN2012/085142 (Chinese language).

PCT International Search Report dated Mar. 7, 2013 in priority International Application No. PCT/CN2012/085142 (English language translation).

PCT Written Opinion dated Mar. 7, 2013 in priority International Application No. PCT/CN2012/085142 (Chinese language).

English machine translation of Chinese Patent Document No. CN 1822088 A (above), from machine translation feature of LexisNexis TotalPatent.

English translation of Abstract of Chinese Patent Document No. CN 1822088 A (above).

English machine translation of Chinese Patent Document No. CN 101750813 A (above), from machine translation feature of LexisNexis TotalPatent.

English translation of Abstract of Chinese Patent Document No. CN 101750813 A (above).

English machine translation of Japanese Patent Document No. JP 2009-015100 A (above), from machine translation feature of Japan Patent Office.

State Intellectual Property Office of the People's Rebulic of China ("SIPO"), First Office Action dated Oct. 29, 2013 issued by SIPO in connection with Chinese counterpart application, Chinese National Application No. 201210048822.8 (Chinese language), published in China.

English translation of the State Intellectual Property Office of the People's Rebulic of China "(SIPO"), First Office Action dated Oct. 29, 2013, issued by SIPO in connection with Chinese counterpart application, Chinese National Application No. 201210048822.8 (above).

State Intellectual Property Office of the People's Rebulic of China ("SIPO"), Notification to Grant the Patent Right dated May 6, 2014 issued by SIPO in connection with Chinese counterpart application, Chinese National Application No. 201210048822.8 (Chinese language), published in China.

English translation of the State Intellectual Property Office of the People's Rebulic of China ("SIPO"), Notification to Grant the Patent Right dated May 6, 2014 issued by SIPO in connection with Chinese counterpart application, Chinese National Application No. 201210048822.8 (above).

DISPLAY DEVICE AND A DRIVING METHOD FOR THE SAME

CROSS REFERENCE TO RELATED APPLICATIONS

This application is based on International Application No. PCT/CN2012/085142 filed on Nov. 23, 2012, which claims priority to Chinese National Application No. 201210048822.8, filed on Feb. 28, 2012, the contents of which are incorporated herein by reference.

TECHNICAL FIELD

Embodiments of the present invention relate to a display device and a driving method for the same.

BACKGROUND

Three-dimensional (3D) display has become the trend of the display field. The principle of 3D display is to generate a stereoscopic image by parallax. That is, a left-eye image is provided to the left eye of an observer, and a right-eye image is provided to the right eye of the observer; the left-eye image and the right-eye image belong to a pair of stereoscopic image with parallax.

3D display techniques based on polarizing glasses is a kind of commonly used 3D display technology. Two images, i.e., left-image and right-image, are projected from the display. The left-image and right-image are respectively distributed to left and right eyes of the user by means of polarizing glasses corresponding to the display. The polarizing glasses employs lenses having different polarizing directions to make the light emitting from the display generate polarizing directions in different angles corresponding to the images.

As shown in FIG. 1, a 2D/3D display device based on polarizing glasses includes: a backlight source 1, a display panel 3, and a patterned retarder 5 interposed between the display panel 3 and the polarizing glasses 6. The display panel 3 can selectively display left-eye images L and right-eye images R, and changes the polarizing directions of the polarizing light with the retarder 5, so that the polarizing light can be received by the polarizing glasses 6. In FIG. 1, a lower polarizing sheet 2 and an upper polarizing sheet 4 are attached to either side of the display panel 3, respectively.

If both the light of the left-eye image and the light of the right-eye image can enter both the left and right eyes, the user will perceive crosstalk. The 3D image visibility on the display device as shown in FIG. 1 is reduced due to the crosstalk at position of the vertical viewing angle. When a user observes the display panel 3 from a lower or upper position instead of from the front, crosstalk will occur at a vertical viewing angle larger than the front viewing angle by a certain angle. The display device has a narrower 3D image viewing angle without crosstalk. In order to increase the vertical viewing angle of the display device shown in FIG. 1, there is another method in which black stripes (BS) are formed on the retarder. As shown in FIG. 2, in such a method, when a user observes the display device at position D which is a certain distance from the display device, the resultant vertical viewing angle α without crosstalk depends on the size of the black matrix (BM) on the display panel 3, the size of the BS, and the distance S between the display panel 3 and the retarder 5. As sizes of the BM and BS and the distance S increase, the vertical viewing angle α increases.

Although the BS increases the vertical viewing angle of the display device to a certain extent, the BS may interact with the BM to generate moiré. Thus, when a 2D image is displayed on the display device, the visibility of the 2D image is greatly reduced due to the moiré. In addition, since the BS are formed at positions of the retarder 5 corresponding to pixels of the display panel 3, when a 2D image is displayed on the 3D display device, the luminance of the 2D image may be also reduced due to the BS.

SUMMARY

An embodiment of the present invention provides a display device, which comprises: a display panel comprising a pixel electrode array, wherein each of the pixel electrode comprises at least one main pixel electrode portion and at least one secondary pixel electrode portion, a gate line is disposed between two adjacent rows of pixel electrodes, a gate line is disposed between portions of each pixel electrode, a data line is disposed between two adjacent columns of pixel electrodes, and all portions of the pixel electrodes in the same column are connected to a same data line; and a gate driving device for inputting a gate shift pulse and a control signal to the display panel, so that for the display panel, in a 2D mode, all portions of the pixel electrodes are inputted with data signals, and in a 3D mode, a portion of each pixel electrode is inputted a data signal while another portion is not inputted with the data signal but used to form a black stripe.

An embodiment of the present invention further provides a method for driving a display device, comprises: inputting a control signal according to property of the image to be displayed, so that in a 2D mode, all portions of each pixel electrode on the display panel are used to display a 2D image, and in a 3D mode, a portion of each pixel electrode is used for a black stripe.

BRIEF DESCRIPTION OF THE DRAWING

In order to make the technical solution of the embodiments of the present invention become more apparent, the accompanying drawings of the embodiments will be briefly described hereafter. It is obvious that the accompanying drawings only relate to some embodiments of the present invention and should not be construed as limited to the present invention.

DETAILED DESCRIPTION

In order to make the objective, the technical solution and the advantages of the present invention become more apparent, technical solutions of the embodiments of the present invention will be described hereafter with reference to the accompanying drawings. It should be understood that only some embodiments of the present invention are described herein, not all embodiments of the present invention. All other embodiments obtained by those ordinary skilled in the art without inventive labor based on the embodiments of the present invention will fall into the scope of the present invention.

An embodiment is demonstrated with reference to an example in which each pixel electrode comprises one main pixel electrode portion and one secondary pixel electrode portion. The main pixel electrode portion is used to display an image, and the secondary pixel electrode portion is used to form a BS in a 3D mode. The case in which a plurality of main pixel electrode portions and second pixel electrodes are included can be obtained by analogy, that is, a plurality of gate lines, a plurality of control TFTs and a plurality of control signal lines are added accordingly. The driving method can be obtained by analogy and the repetitive description for the method will be omitted herein. The manner in which the pixel electrodes are divided to display image and to form a BS in a 3D mode can be arbitrary.

A 2D/3D display device according to an embodiment of the present invention includes a display panel, a gate driving device, a data driving device, and a control device.

Figure 1:
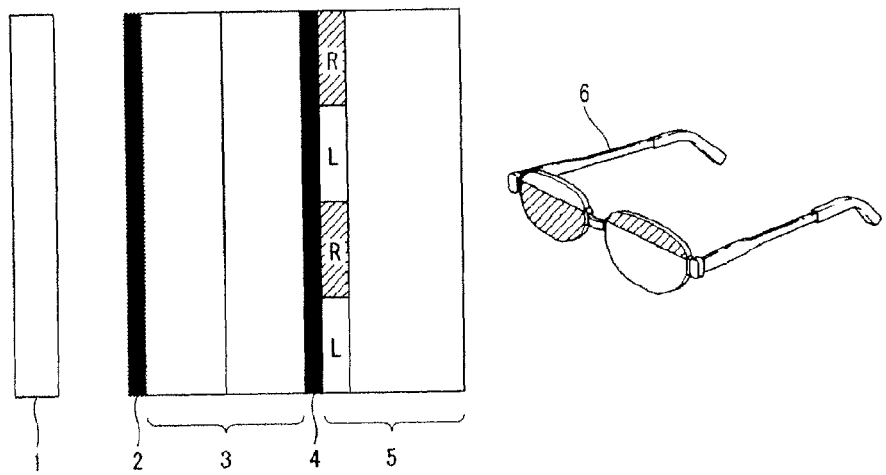
FIG. 1 is a structural view of a conventional display device.
Figure 2:
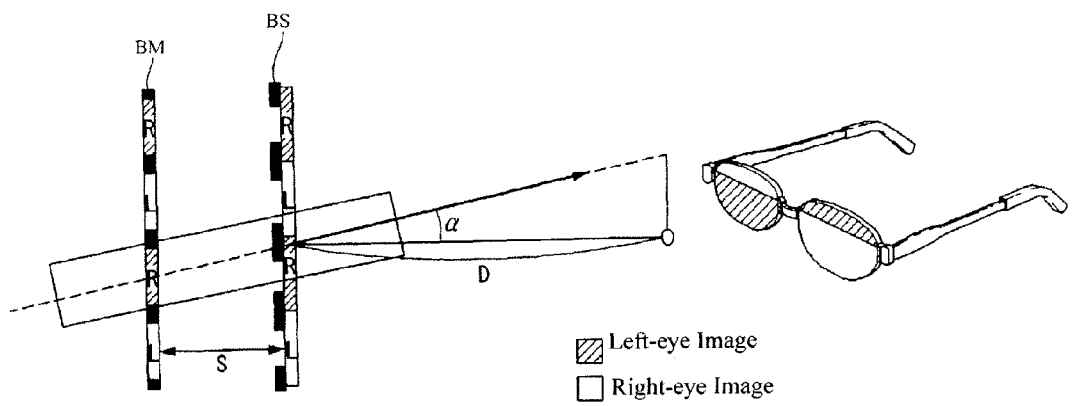
FIG. 2 is a structural view of a conventional display device in which BS is formed for the retarder.
Figure 3:
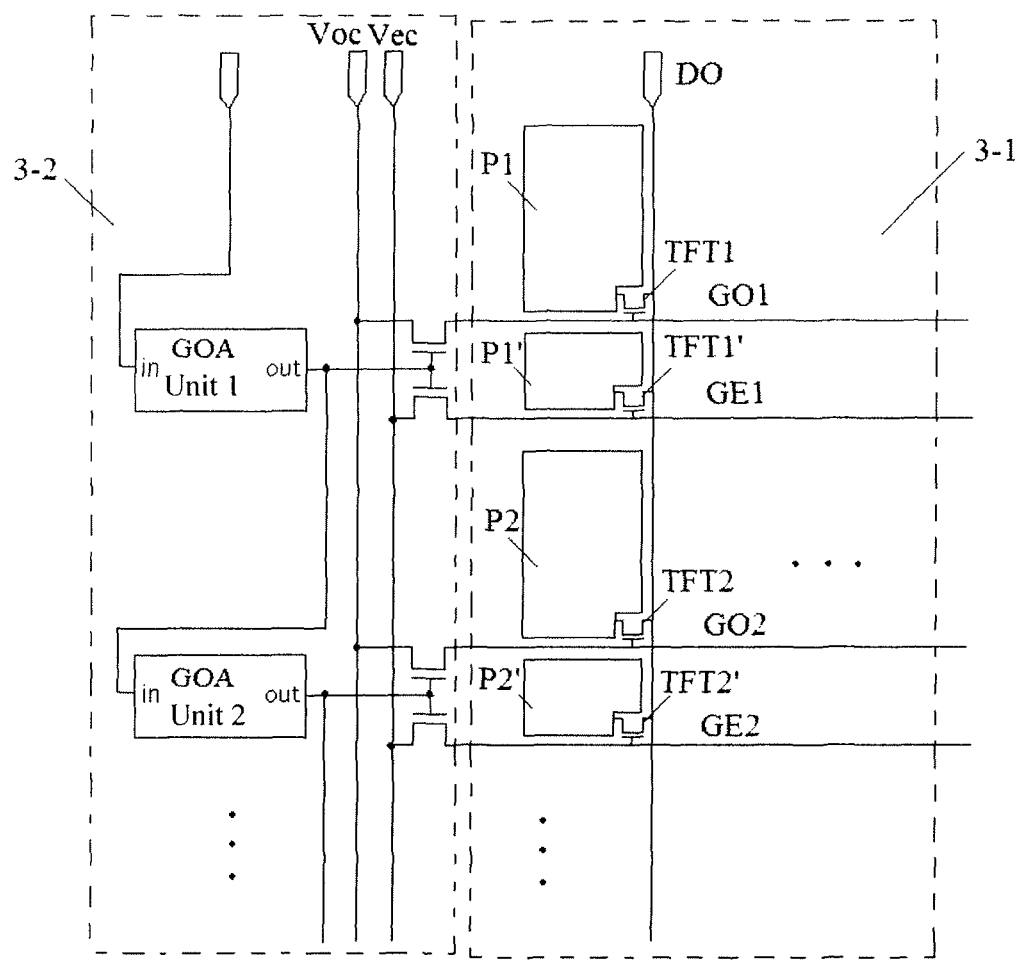
FIG. 3 is a view schematically illustrating part of the display device and the principle according to an embodiment of the present invention.

The display panel includes an array substrate 3-1. A pixel electrode array is formed on the array substrate 3-1. Each of the pixel electrodes includes a main pixel electrode portion and a secondary pixel electrode portion. A gate line is disposed between two adjacent rows of pixel electrodes, and a gate line is also disposed between separated portions of each pixel electrode. A data line is disposed between two adjacent columns of pixel electrodes, and separated portions of pixel electrodes in the same column are connected with the same data line. As shown in FIG. 3, the first pixel electrode is divided into a main pixel electrode portion P1 and a secondary pixel electrode portion P1', and the second pixel electrode is divided into a main pixel electrode portion P2 and a secondary pixel electrode portion P2'. The main pixel electrode portions P1 and P2 are used to display images, and the secondary pixel electrode portions P1' and P2' are used to form a BS in a 3D mode. A gate line GE1 is disposed between two pixel electrodes, and a gate line GE2 is disposed between the second pixel electrode and the third pixel electrode (not shown). A gate line GO1 is disposed between P1 and P1', and a gate line GO2 is disposed between P2 and P2'. A data line DO is disposed between the first column of pixel electrodes and the second column of pixel electrodes (not shown), and so on. Each of the pixel electrode P1, P1', P2, P2' corresponds to one TFT, i.e., TFT1, TFT1', TFT2, and TFT2', and each of TFT1, TFT1', TFT2, and TFT2' is connected to DO.

The gate driving device 3-2 is used to an input gate shift pulse and a control signal to the display panel, so that all portions of each pixel electrode are used to display an image when the display panel is in a 2D mode, and in a 3D mode, a portion of each pixel electrode is used to form a black stripe (BS) while another portion is used to display a 3D image. In the device of the embodiment, in a 3D mode, the main pixel electrode portion of each pixel electrode is used as a normal pixel electrode for display, while the secondary pixel electrode portion is used to form a BS so that a BS is formed in the display panel. The display device of the embodiment may provide a larger viewing angle without affecting the visibility and luminance of the display device.

In the device of the embodiment, the gate driving device 3-2 includes a shift pulse generating circuit and a control circuit. The shift pulse generating circuit may be any type of gate driver on array (GOA) circuit or any type of gate driving IC provided on or outside of the array substrate. In the device of the embodiment, the shift pulse generating circuit is a GOA circuit including multi-level GOA units, and the output of the GOA unit in each level is used as the input of the GOA unit in the next level, exemplified by the GOA unit 1 and the GOA unit 2 shown in FIG. 3. The GOA circuit may be any integrated gate shift register capable of generating shift pulse.

The control circuit includes a control TFT (for TFT 1 and TFT 2 shown in the drawings) corresponding to each main pixel electrode portion, a control TFT (for TFT 1' and TFT 2' shown in the drawings) corresponding to each secondary pixel electrode portion, and two control signal lines (the image display control signal line Voc and the BS control signal line Vec). The output of the GOA unit in each level is used as the gate inputs of the two control TFTs. The lines Voc and Vec are connected with the drains of the control TFTs, respectively. The sources of the control TFTs are connected with the gates of the TFTs for the main pixel electrode portions and the gates of the TFTs for the secondary pixel electrode portions, respectively, to provide gate signals for the two portions of each pixel electrode.

The data driving device is used to input a data signal to the data line, which is well known in the field and repentant description therefore is omitted here. The control device is used to provide an overall control signal, a 2D/3D selection signal, a clock signal and so on for the gate driving device and the data driving device, and especially to control the input signal of the data line and the input signal of the control signal line based on the characteristic of the image to be displayed and a driving manner, so as to achieve the object of the embodiment of the present invention.

An embodiment of the present invention also provides a method for driving a display device, including: a control device inputs an overall control signal to a data driving device and a gate driving device according to property of the image to be displayed (2D or 3D image) to control an input signal of a data line and an input circuit of a control signal line, so that in a 2D mode, all portions of each pixel electrode of the display panel are used to display a 2D image, and in a 3D mode, a portion (secondary pixel electrode portion in the present embodiment) of all portions of each pixel electrode is used as a black stripe.

In the method of the embodiment, in a 2D mode, the GOA unit outputs a gate shift pulse, and a data driving device inputs a 2D image data voltage to the data line. At the same time, the control circuit inputs a high level control signal to all control signal lines. Based on the output signal of the GOA unit, the same signal is inputted to gate lines corresponding to all the portions of the same pixel electrode, and the main pixel electrode portion and the secondary pixel electrode portion of the same pixel electrode are turned on or turned off simultaneously so as to be used to display a 2D image.

Figure 4:
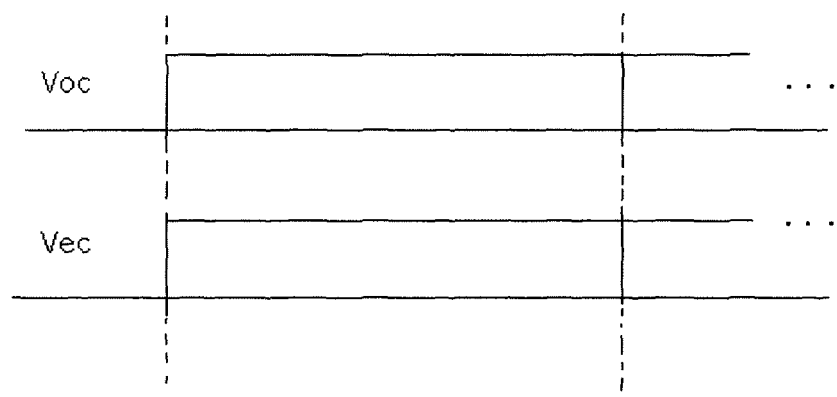
FIG. 4(a) is a view schematically illustrating a control signal in a 2D mode in the driving method of the display device according to an embodiment of the present invention.
FIG. 4(b) is a view schematically illustrating a control signal in a 3D mode in the driving method of the display device according to an embodiment of the present invention.
FIG. 4(c) is a view schematically illustrating a control signal in another 3D mode in the driving method of the display device according to an embodiment of the present invention.
Figure 4:
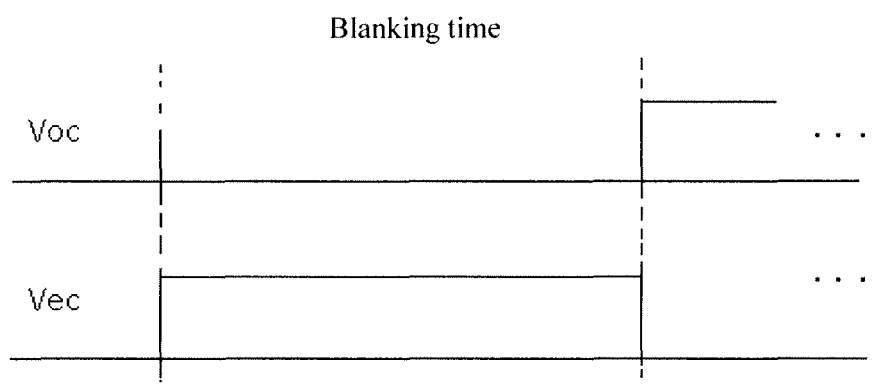
Figure 4:
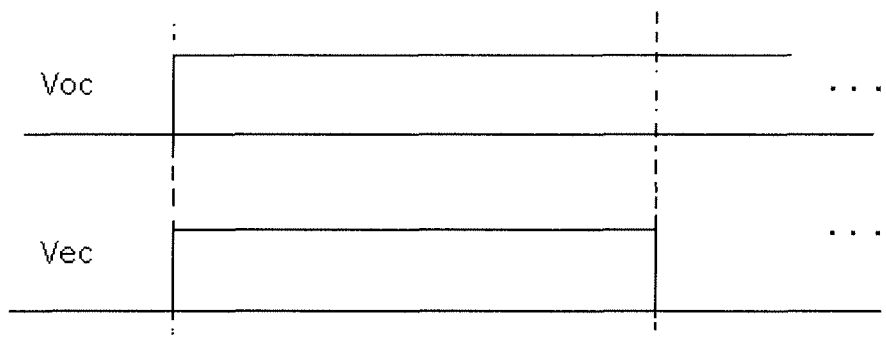

As shown in FIG. 4 (a), an image data voltage is inputted from DO, a high level signal is inputted from the lines Voc and Vec at the same time, a shift pulse is outputted from GOA unit 1, the gate lines GO1 and GE1 are in the state of high level signal, and the electrodes P1 and P1' are turned on simultaneously so as to be used together as a pixel electrode to display a 2D image. The signal inputted from the lines Voc and Vec and the sizes of TFT 1 and TFT 1' can be adjusted according to an actual situation, so that the main pixel electrode portion P1 and the secondary pixel electrode portion P1' are charged at the same level to achieve display without fluctuation. For example, if the same signals are inputted from the lines Voc and Vec, the sizes of the TFT 1 and TFT 1' should be adjusted; otherwise, signals inputted from the lines Voc and Vec should be adjusted to be different from each other.

Since the sizes of the main and secondary pixel electrode portions are typically different from each other, that is, the sizes of the pixel electrodes are different, they have different storage capacitance and need different charging currents. Therefore, the control TFTs of different aperture ratios can be selected to provide different gate voltages to the switch TFTs in the pixel regions and provide different on-state currents. Otherwise, the control TFTs are the same while the signals from the lines Voc and Vec are different, and in this case, the same effect can be achieved.

In a 3D mode, there are two optional driving methods.

In the first driving method, during a first blanking time, a shift pulse is outputted from GOA unit. The control circuit inputs a low level signal to the control signal line of the main pixel electrode portion and inputs a high level signal to the control signal line of the secondary pixel electrode portion. At the same time, the data driving device inputs a common level signal to the data line. At this time, the main pixel electrode portion is turned off, and the secondary pixel electrode portion is turned on and charged to the common level and thus displays in black. After the blanking time, the GOA unit outputs a gate shift pulse according to the demand for 3D display. At the same time, the data driving device inputs a 3D image data voltage to the data line, the control circuit inputs a high level signal to the control signal line of the main pixel electrode portion and inputs a low level signal to the control signal line of the secondary pixel electrode portion to turn on a corresponding main pixel electrode portion, and each of the secondary pixel electrode portions still remains in black. In this way, the secondary pixel electrode portion will be used for a BS in 3D display. Thereafter, the states of the two control signals are maintained. This method is referred to as a blanking time driving method.

As shown in FIG. 4(b), in the blanking time, the GOA unit outputs a shift pulse, the control circuit inputs a low level signal to the line Voc and a high level signal to the line Vec. At the same time, the data driving device inputs a common level signal to the data line DO. At this time, the corresponding main pixel electrode portion is turned off, and the secondary pixel electrode portion is turned on and charged to a common level and thus displays in black. After the blanking time, the GOA unit outputs a gate shift pulse according to the demand for 3D display. At the same time, the data driving device inputs a 3D image data voltage to the data line, the control circuit inputs a high level signal to the line Voc and inputs a low level signal to the line Vec to turn on a corresponding main pixel electrode portion, and each of the secondary pixel electrode portions still remains in black. In this way, the secondary pixel electrode portions will be used for BS in 3D display. Thereafter, the signals over the lines Voc and Vec are maintained at a high level and a low level, respectively, the secondary pixel electrode portion maintains in black, and the main pixel electrode portion is turned on or turned off according to the output signal of the GOA unit.

The blanking time can be set according to factors such as the resolution and refresh interval of the device, as long as all the secondary pixel electrode portions display in black and do not display too long to influence visual effect.

In the second driving method, when the display device is switched to a 3D mode, a shift pulse is inputted from a GOA unit. The control circuit inputs a high level signal to the control signal lines for the main pixel electrode portion and the secondary pixel electrode portion. At the same time, the data driving device inputs a common level signal to the data line. The main pixel electrode portion and the secondary pixel electrode portion are turned on similarly to the 2D mode, and charged to a common level. At this time, all the pixel electrodes display in black. After the blanking time, a high level signal is still inputted to the control signal line for the main pixel electrode portion while a low level signal is inputted to the control signal line for the secondary pixel electrode portion, that is, the secondary pixel electrode portion is turned off and displays in black so as to be used as BS. Thereafter, the input states of the control signals are maintained. The main pixel electrode portion is changed according to the output signals from the GOA unit while the secondary pixel electrode portion maintains at common level and displays in black. This method is referred to as inserting black frame driving method.

As shown in FIG. 4(c), when the display device switching to a 3D mode, a shift pulse is outputted from the GOA unit, the control circuit inputs a high level signal to the lines Voc and Vec. At the same time, the data driving device inputs a common level signal to the line DO. The main pixel electrode portion and the secondary pixel electrode portion are turned on similarly to the 2D mode, and charged to the common level. After the time period of one frame, the high level signal is still inputted to the line Voc while a low level signal is inputted to the line Voe, that is, the secondary pixel electrode portion is turned off and display in black. Thereafter, the high level signal input to the line Voc and the low level signal input to the line Vec are maintained.

The blanking time can be set according to factors such as resolution and refresh interval of the device, as long as all the pixel electrodes display in black and do not display too long to influence the visual effect. In the embodiment, the blanking time is one frame time period.

It should be noted that the above embodiment is described by example in which each pixel electrode is divided into one main pixel electrode portion and one secondary pixel electrode portion. However, for the case in which there are more than one main pixel electrode portions and secondary pixel electrode portions, the number of the main pixel electrode portions and/or the secondary pixel electrode portions for display and the number of the main pixel electrode portions and on the secondary pixel electrode portions for BS may be selected optionally, and the control signal lines will be increased accordingly and the signals input from the control signal lines should be adjusted accordingly. In addition, other necessary components of the display device of the embodiment of the present invention, such as a retarder, a pair of polarizing glasses and so on, are well known to this field, and repentant description therefor will be omitted here.

In the display device and method for driving the display device according to an embodiment of the present invention, black strips are formed in the display panel by dividing each pixel electrode into a portion for displaying image and a portion for forming a black strip, so that the display devices according to the embodiment of the present invention have a larger vertical viewing angle without affecting visibility and luminance of the display device.

The embodiments of the present invention provide at least the following structure and method.

(1) A display device, comprising:

a display panel comprising a pixel electrode array, wherein each of the pixel electrode comprises at least one main pixel electrode portion and at least one secondary pixel electrode portion, a gate line is disposed between two adjacent rows of pixel electrodes, a gate line is disposed between portions of each pixel electrode, a data line is disposed between two adjacent columns of pixel electrodes, and all portions of the pixel electrodes in the same column are connected to a same data line; and a gate driving device for inputting a gate shift pulse and a control signal to the display panel, so that for the display panel, in a 2D mode, all portions of the pixel electrodes are inputted with data signals, and in a 3D mode, a portion of each pixel electrode is inputted a data signal while another portion is not inputted with the data signal but used to form a black stripe.

(2) The display device according to (1), wherein, in a 2D mode, all the portions of each pixel electrode are used to display a 2D image, and in a 3D mode, one portion of each pixel electrode is used to display a 3D image while other portion is used to form the black stripe.

(3) The display device according to (1) or (2), wherein the gate driving device comprises a shift pulse generating circuit and a control circuit, the control circuit comprises:

control thin film transistors, wherein the number of the control thin film transistors is equal to a sum of the number of the main pixel electrode portions and the secondary pixel electrode portions in one column, and a source output of each control thin film transistor acts as a gate signal for the main pixel electrode portions in each row or the secondary pixel electrode portions in each row, gates of the control thin film transistors are connected with the outputs of the corresponding shift pulse generating circuits;

at least two control signal lines, the at least two signal lines are divided into two groups, one group is an image display control signal line connected to drains of the control thin film transistors corresponding to the pixel electrodes for displaying a 3D image, the other group is a black stripe control signal line connected to drains of the control thin film transistors corresponding to the pixel electrode for forming black strips.

(4) The display device according to (3), wherein the shift pulse generating circuit is a multi-level gate driver for an array substrate, an output of each level of the multi-level gate driver for an array substrate is connected with the gates of all the control thin film transistors corresponding to portions of the same pixel electrode.

(5) The display device according to any one of (1) to (4), wherein the display device further comprises a data driving device, in the 2D mode, the data driving device inputs a 2D image data voltage to all the pixel electrodes, and in the 3D mode, the data driving device inputs a 3D image data voltage to corresponding portions of each of the pixel electrode for displaying a 3D image.

(6) The display device according to any one of (1) to (5), wherein the display device further comprises a control device for inputting a control signal to the gate driving device and the date driving device, in the 2D mode, the control signal controls the gate driving device to input data signals to all the pixel electrodes and control the data driving device to input 2D image data voltages to all the pixel electrodes;

in the 3D mode, the control signal controls the gate driving device to input the data signals to a portion of each pixel electrode while not to another portion of the pixel electrode, and controls the data driving device to input a 3D image data voltage to the corresponding portion of each of the pixel electrode for displaying a 3D image.

(7) The display device according to any one of (1) to (6), wherein each of the pixel electrode comprises one main pixel electrode portion and one secondary pixel electrode portion, in a 3D mode, the main pixel electrode portion is used to display a 3D image and the secondary pixel electrode portion is used to form a black stripe.

(8) A driving method for a display device, comprising: inputting a control signal according to property of the image to be displayed, so that in a 2D mode, all portions of each pixel electrode on the display panel are used to display a 2D image, and in a 3D mode, a portion of each pixel electrode is used for a black stripe.

(9) The driving method according to (8), wherein in the 2D mode, a data driving device inputs a 2D image data voltage to a data line, a control circuit inputs a high level signal to all control signal lines, and all portions of the pixel electrodes in each row are turned on or turned off simultaneously according to an output signal from a shift pulse generating circuit;

in the 3D mode, during a first blanking time, the control circuit inputs a low level signal to a image display control signal line and inputs a high level signal to a black stripe control signal line, the data driving device inputs a common level signal to the data line; after the first blanking time, the control circuit inputs a high level signal to the image display control signal line and inputs a low level signal to the black stripe control signal line, and the date driving device inputs a 3D image data voltage to the data line.

(10) The driving method according to (8) or (9), wherein in the 2D mode, the data driving device inputs a 2D image data voltage to the data line, a control circuit inputs a high level signal to all control signal lines, and all portions of the pixel electrodes in each row are turned on or turned off simultaneously according to an output signal from a shift pulse generating circuit;

when the display device is switched to the 3D mode, the control circuit inputs a high level signal to all control signal lines, the data driving device inputs a common level signal to the data line; after a second blanking time, the control circuit inputs a high level signal to the image display control signal line and inputs a low level signal to the black stripe control signal line, and the date driving device inputs a 3D image data voltage to the data line.

What are described above is related to the illustrative embodiments of the disclosure only and not limitative to the scope of the disclosure; the scopes of the disclosure are defined by the accompanying claims.

The invention claimed is:

1. A display device, comprising:
a display panel comprising a pixel electrode array, wherein each of the pixel electrode comprises at least one main pixel electrode portion and at least one secondary pixel electrode portion, a gate line is disposed between two adjacent rows of pixel electrodes, a gate line is disposed between portions of each pixel electrode, a data line is disposed between two adjacent columns of pixel electrodes, and all portions of the pixel electrodes in the same column are connected to a same data line; and
a gate driving device for inputting a gate shift pulse and a control signal to the display panel, so that for the display panel, in a 2D mode, all portions of the pixel electrodes are inputted with data signals, and in a 3D mode, a portion of each pixel electrode is inputted a data signal while another portion is not inputted with the data signal but used to form a black stripe;
wherein the gate driving device comprises a shift pulse generating circuit and a control circuit, the control circuit comprises:
control thin film transistors, and a source output of each control thin film transistor acts as a gate signal for the main pixel electrode portions in each row or the secondary pixel electrode portions in each row, gates of the control thin film transistors are connected with the outputs of the corresponding shift pulse generating circuits; and
at least two control signal lines, wherein the at least two signal lines are divided into two groups, one group is an image display control signal line connected to drains of the control thin film transistors corresponding to the pixel electrodes for displaying a 3D image, the other group is a black stripe control signal line connected to drains of the control thin film transistors corresponding to the pixel electrode for forming black strips.

2. The display device according to claim 1, wherein, in the 2D mode, all the portions of each pixel electrode are used to display a 2D image, and in the 3D mode, one portion of each pixel electrode is used to display a 3D image while other portion is used to form the black stripe.

3. The display device according to claim 1, wherein the shift pulse generating circuit is a multi-level gate driver for an array substrate, an output of each level of the multi-level gate driver for an array substrate is connected with the gates of all the control thin film transistors corresponding to portions of the same pixel electrode.

4. The display device according to claim 1, wherein the display device further comprises a data driving device, in the 2D mode, the data driving device inputs a 2D image data voltage to all the pixel electrodes, and in the 3D mode, the data driving device inputs a 3D image data voltage to corresponding portions of each of the pixel electrode for displaying a 3D image.

5. The display device according to claim 4, wherein the display device further comprises a control device for inputting a control signal to the gate driving device and the date driving device, in the 2D mode, the control signal controls the gate driving device to input data signals to all the pixel electrodes and control the data driving device to input 2D image data voltages to all the pixel electrodes;

in the 3D mode, the control signal controls the gate driving device to input the data signals to a portion of each pixel electrode while not to another portion of the pixel electrode, and controls the data driving device to input a 3D image data voltage to the corresponding portion of each of the pixel electrode for displaying a 3D image.

6. The display device according to claim 1, wherein each of the pixel electrode comprises one main pixel electrode portion and one secondary pixel electrode portion, in a 3D mode, the main pixel electrode portion is used to display a 3D image and the secondary pixel electrode portion is used to form a black stripe.

7. A driving method for a display device according to claim 1, comprising: inputting a control signal according to property of the image to be displayed, so that in a 2D mode, all portions of each pixel electrode on the display panel are used to display a 2D image, and in a 3D mode, a portion of each pixel electrode is used for a black stripe.

8. The driving method according to claim 7, wherein in the 2D mode, a data driving device inputs a 2D image data voltage to a data line, a control circuit inputs a high level signal to all control signal lines, and all portions of the pixel electrodes in each row are turned on or turned off simultaneously according to an output signal from a shift pulse generating circuit;

in the 3D mode, during a first blanking time, the control circuit inputs a low level signal to a image display control signal line and inputs a high level signal to a black stripe control signal line, the data driving device inputs a common level signal to the data line; after the first blanking time, the control circuit inputs a high level signal to the image display control signal line and inputs a low level signal to the black stripe control signal line, and the date driving device inputs a 3D image data voltage to the data line.

9. The driving method according to claim 7, wherein in the 2D mode, the data driving device inputs a 2D image data voltage to the data line, a control circuit inputs a high level signal to all control signal lines, and all portions of the pixel electrodes in each row are turned on or turned off simultaneously according to an output signal from a shift pulse generating circuit;

when the display device is switched to the 3D mode, the control circuit inputs a high level signal to all control signal lines, the data driving device inputs a common level signal to the data line; after a second blanking time, the control circuit inputs a high level signal to the image display control signal line and inputs a low level signal to the black stripe control signal line, and the date driving device inputs a 3D image data voltage to the data line.

\* \* \* \* \*